No. 882,035. PATENTED MAR. 17, 1908.
C. G. W. WERNICKE.
SAFETY TOOTH CATCHER FOR THRESHING MACHINES.
APPLICATION FILED MAY 3, 1907.

2 SHEETS—SHEET 1.

Witnesses
H. G. Dittbenner
Leon B. Losey

Inventor
Carl G. W. Wernicke
By his Attorneys
Williams & Michael

No. 882,035. PATENTED MAR. 17, 1908.
C. G. W. WERNICKE.
SAFETY TOOTH CATCHER FOR THRESHING MACHINES.
APPLICATION FILED MAY 3, 1907.
2 SHEETS—SHEET 2.
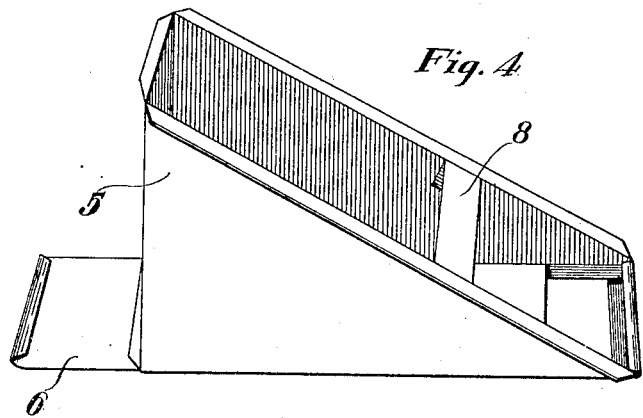
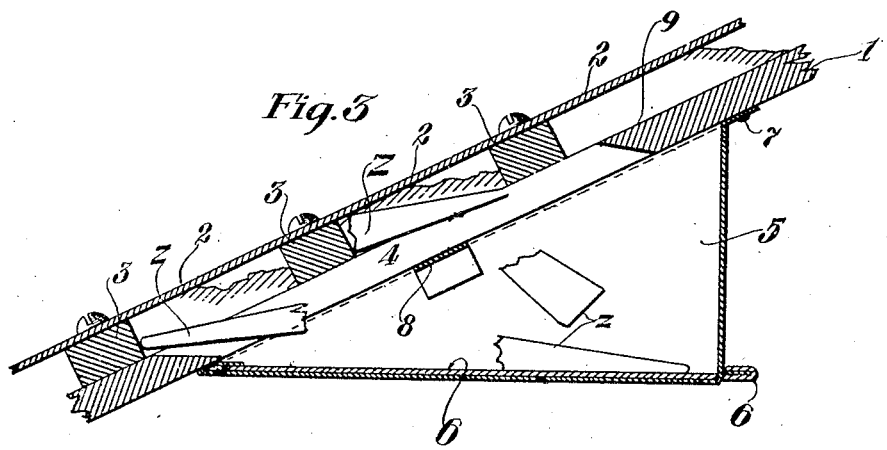
Witnesses
Inventor
Carl G. W. Wernicke
By his Attorneys

UNITED STATES PATENT OFFICE.

CARL G. W. WERNICKE, OF MINNEAPOLIS, MINNESOTA.

SAFETY TOOTH-CATCHER FOR THRESHING-MACHINES.

No. 882,035.   Specification of Letters Patent.   Patented March 17, 1908.

Application filed May 3, 1907. Serial No. 371,744.

*To all whom it may concern:*

Be it known that I, CARL G. W. WERNICKE, a citizen of the United States, residing at Minneapolis, in the county of Hennepin and State of Minnesota, have invented certain new and useful Improvements in Safety Tooth-Catchers for Threshing-Machines; and I do hereby declare the following to be a full, clear, and exact description of the invention, such as will enable others skilled in the art to which it appertains to make and use the same.

My invention has for its object to provide a simple and efficient device for catching broken cylinder or concave teeth, and thereby preventing the return of the same with the tailings to the cylinder and concave, and to the above ends the invention consists of the novel devices and combinations of devices hereinafter described and defined in the claims. This device, which is the form of a catch box of peculiar construction and arrangement, is preferably applied to the bottom of a tailings elevator, but from a broad point of view might be applied at any suitable point in the feed mechanism which carries the tailings of a threshing machine back to the cylinder and concave for the purpose of completing the threshing thereof.

In the accompanying drawings which illustrate the preferred form and arrangement of the device, like characters indicate like parts throughout the several views.

Figure 1:
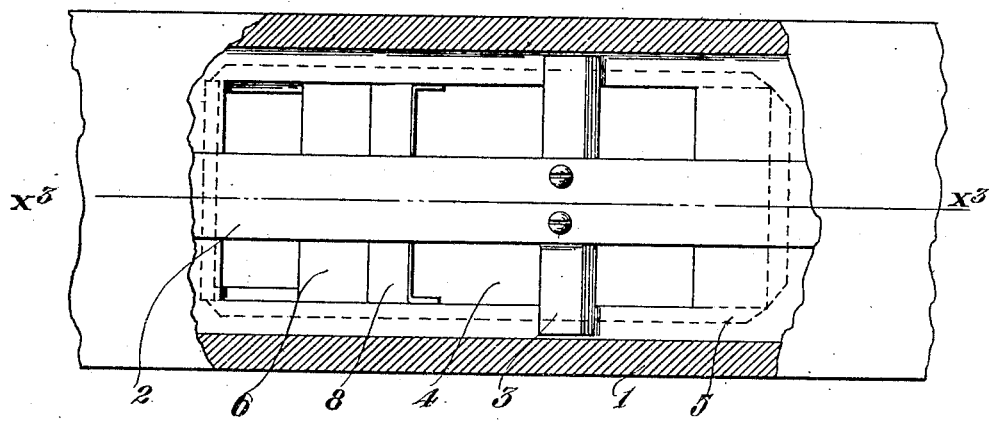
Figure 2:
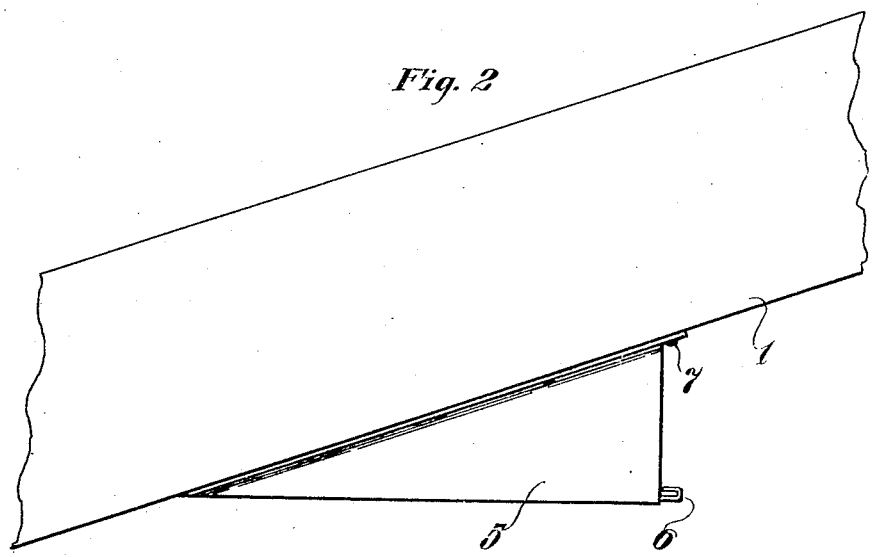

Referring to the drawings, Figure 1 is a view partly in plan and partly in horizontal section, and with some parts broken away, showing a portion of the tailings elevator of a threshing machine, and illustrating my improved catch box as applied thereto. Fig. 2 is a side elevation of parts shown in Fig. 1. Fig. 3 is a vertical section taken on the line $x^3$ $x^3$ of Fig. 1; and Fig. 4 is a perspective view of the improved catch box removed from working position.

The numeral 1 indicates the leg or spout of a tailings elevator, and the numeral 2 indicates the elevator belt which is provided with the usual transverse cleats 3 that are arranged to slide over the bottom of the said leg 1. At a suitable point, the bottom of the leg 1 is cut away to form a quite long opening 4, and secured to the bottom of the leg below this opening, is the catch box 5. This catch box, as shown and preferred, is triangular in its vertical longitudinal section, and is provided with an approximately horizontal sliding bottom 6, which bottom is mounted to slide in grooves formed in the lower edges of the depending parallel sides of said box. The upper edge of said box is preferably flanged and secured to the bottom of the leg 1 by means of screws or nails 7. At its upper portion adjacent to the bottom of the leg 1, the box is formed with one or more transverse bridge bars 8. By reference to Fig. 3 it will be noted that that portion of the bottom of the leg 1 which is just above the upper extremity of the slot 4 is beveled and projects over the extreme upper end portions of the catch box 5. In Fig. 3, the character $z$ indicates fragments of broken portions of cylinder or concave teeth which have been broken and carried into the catch box by the conveyer belt 2—3.

In operation, the box 5 will be nearly filled up with the tailings, but the bridge bar 8 and the projecting portion 9 of the leg 1, which also acts as a bridge bar will prevent the box from being tightly or completely packed with the tailings, because directly under these parts there will be unfilled spaces. When a broken tooth is carried into the opening 4 in the bottom of the elevator leg, it will, by one of the slats 3 and by gravity be pushed into the catch box 5 and caused to embed itself beneath the tailings contained therein, and when this takes place, the resistance to the entrance of the tooth into the box is decreased because of the fact that displaced tailings find ready escape into the unpacked spaces beneath the said bridges 8 and 9. From time to time, the catch box may be emptied by drawing out its sliding bottom 6.

The device described, while simple and of very small cost, has in practice been found highly efficient for the purposes had in view. Furthermore, it may be readily applied to threshing machines of standard construction.

What I claim is:

1. The combination with the tailings return mechanism of a threshing machine, of a catch box applied to the under side of a section thereof, substantially as described.

2. The combination with the leg and conveyer belt of the tailings elevator of a threshing machine, said leg having an opening in its bottom, of a catch box applied to said leg below said opening and provided with a displaceable bottom, substantially as described.

3. The combination with the leg and conveyer belt of the tailings elevator of a threshing machine, said leg having an opening in its bottom, of a catch box applied to said leg below said opening and provided with one or more transverse bridge bars in or adjacent to the bottom of said leg, substantially as described.

In testimony whereof I affix my signature in presence of two witnesses.

CARL G. W. WERNICKE.

Witnesses:
MALIE HOEL,
F. D. MERCHANT.